United States Patent [19]

Nakamura

[11] Patent Number: 4,943,910

[45] Date of Patent: Jul. 24, 1990

[54] MEMORY SYSTEM COMPATIBLE WITH A CONVENTIONAL EXPANDED MEMORY

[75] Inventor: Nobutaka Nakamura, Tokyo, Japan

[73] Assignee: Kabushiki Kaisha Toshiba, Kanagawa, Japan

[21] Appl. No.: 181,373

[22] Filed: Apr. 14, 1988

[30] Foreign Application Priority Data

Apr. 14, 1987 [JP] Japan .................................. 62-89708
Apr. 14, 1987 [JP] Japan .................................. 62-89709

[51] Int. Cl.⁵ .............................................. G06F 12/00
[52] U.S. Cl. .................................. 364/200; 364/238.4; 364/246; 364/246.3; 364/254; 364/254.3
[58] Field of Search .................... 364/200, 300, 900

[56] References Cited

U.S. PATENT DOCUMENTS 4,161,036  7/1979  Morris et al. ...................... 364/900

OTHER PUBLICATIONS

"Installing the Above® Board/AT," Intel Corporation, 1985, 1986, 1987, pp. 9-1-9-5.

Primary Examiner—Raulfe B. Zache
Attorney, Agent, or Firm—Finnegan, Henderson, Farabow, Garrett and Dunner

[57] ABSTRACT

A plurality of memory blocks, which includes a plurality of memory areas, each having a page number. Each of the memory blocks has a set number. A page controlling register stores mapping information and a page number of the memory areas. A mapping register stores mapping information including set information that indicates the set number of a memory block in which data supplied from a CPU is stored. A memory controller accesses the memory section in accordance with the mapping information.

3 Claims, 12 Drawing Sheets

| MSB | | | | | | | | | LSB |
|---|---|---|---|---|---|---|---|---|---|
| D9 | D8 | D7 | D6 | D5 | D4 | D3 | D2 | D1 | D0 |
| ME | MA8 | MA7 | MA6 | MA5 | MA4 | MA3 | MA2 | MA1 | MA0 |

*FIG. 3*

| SET X | 0 | 1 | 5 | 6 |
|---|---|---|---|---|
| MA8 = BA8 | 0 | 0 | 1 | 1 |
| MA7 = BA7 | 0 | 1 | 0 | 1 |

*FIG. 4*

| MSB | | | | | | | LSB |
|---|---|---|---|---|---|---|---|
| D7 | D6 | D5 | D4 | D3 | D2 | D1 | D0 |
| PE | PA6 | PA5 | PA4 | PA3 | PA2 | PA1 | PA0 |

*FIG. 16* (PRIOR ART)

| MSB | | | | | | | | | | LSB |
|---|---|---|---|---|---|---|---|---|---|---|
| D10 | D9 | D8 | D7 | D6 | D5 | D4 | D3 | D2 | D1 | D0 |
| ME | MA23 | MA22 | MA21 | MA20 | MA19 | MA18 | MA17 | MA16 | MA15 | MA14 |

FIG. 7

| | i | 14 | 15 | 16 | 17 | 18 | 19 | 20 | 21 | 22 | 23 |
|---|---|---|---|---|---|---|---|---|---|---|---|
| SET | 0 | 0 | 0 | 0 | 1 | 0 | 1 | 0 | 0 | 0 | 0 |
| | 1 | 0 | 0 | 0 | 1 | 0 | 1 | 0 | 1 | 0 | 0 |
| | 5 | 0 | 0 | 0 | 1 | 0 | 1 | 0 | 0 | 1 | 0 |
| | 6 | 0 | 0 | 0 | 1 | 0 | 1 | 0 | 1 | 1 | 0 |

FIG. 8

| | i | 14 | 15 | 16 | 17 | 18 | 19 | 20 | 21 | 22 | 23 |
|---|---|---|---|---|---|---|---|---|---|---|---|
| SET | 0 | 0 | 0 | 0 | 0 | 0 | 1 | 0 | 0 | 0 | 0 |
| | 1 | 0 | 0 | 0 | 0 | 0 | 1 | 0 | 1 | 0 | 0 |
| | 5 | 0 | 0 | 0 | 0 | 0 | 1 | 0 | 0 | 1 | 0 |
| | 6 | 0 | 0 | 0 | 0 | 0 | 1 | 0 | 1 | 1 | 0 |

FIG. 9

(AMOUNT OF CONVENTIONAL MEMORY 512KB)

(AMOUNT OF CONVENTIONAL MEMORY 640KB, NO EXTENDED MEMORY)

(AMOUNT OF CONVENTIONAL MEMORY 512KB, NO EXTENDED MEMORY)

MEMORY SYSTEM COMPATIBLE WITH A CONVENTIONAL EXPANDED MEMORY

BACKGROUND OF THE INVENTION

The present invention relates to an expanded memory of a so-called LIM system, which is a type of expanded memory system.

Recently, the memory capacity of personal computers has been increased, and a variety of expanded memory systems have been proposed. In an expanded memory of the LIM type, a portion of a memory address space of a central processing unit (CPU) is used as a window, and the CPU accesses a maximum of 8 MB through the window. The specification of the LIM system was developed by joint research of three U.S. companies, Lotus Development, Intel, and Microsoft Corp. The LIM expanded memory board is a commercially available product sold by Intel under the trademark "ABOVE BOARD".

FIG. 14 shows an arrangement of an expanded memory utilizing the LIM system. Four contiguous windows are provided for accessing the expanded memory in units of 16 KB. Each 16-KB window is called a physical page, and a combination of the four physical pages is called a page frame. The expanded memory that is accessed through each physical page has a 16-KB unit called a logical page. There are a maximum of 512 logical pages, and the total amount is 16 KB×512=8 MB. The correspondence between the physical and logical pages is established by changing the content of an I/O port address, which is called a page controlling register, under the control of the CPU. The CPU can access a maximum of 8-MB of expanded memory.

FIG. 15 is a block diagram of a prior-art system. Each expanded memory has a set number, and corresponds to an I/O port address of the page controlling register. Each expanded memory includes four page controlling registers. A page controlling register of physical page Y and set X (X=0, 1, 5, 6; Y=0, 1, 2, 3) has a format shown in FIG. 16. In FIG. 16, the bits of the page controlling register have the following meanings:

PE: page enable bit
0: disable

Mapping from physical page Y to a logical page is not performed in the range of the logical page of set X.

1: enable

Mapping from physical page Y to a logical page is performed in the range of the logical page of set X.

PAi: page address bit (i=0 to 6)

A logical page for mapping physical page Y is designated. If PE=0, this bit is invalid.

The system operation will be described below with reference to FIG. 15. CPU 110 accesses conventional memory 130, extended memory 140, and expanded memories 810, 820, 830, and 840 through system bus 120. When expanded memories 810, 820, 830, and 840 are to be accessed, CPU 110 sets arbitrary values in page controlling registers 811, 821, 831, and 841 by I/O write.

Assume that data in physical page Y is mapped to logical page Z (Z=0, 1, ..., 511). Set X, including logical page Z to which physical page Y is to be mapped, is determined. An offset value for mapping data in physical page Y to the logical page of set X is then calculated. The offset value is set to be PAi, and the CPU I/O writes 8-bit data having PE=1 in the page controlling register of page Y and set X to which data is mapped. At the same time, the CPU I/O writes 8-bit data having PE=0 in the page controlling registers of other sets. Note that PAi in other page controlling registers is an arbitrary value. When CPU 110 performs memory access to physical page Y after data is set in the page controlling register, only a set having PE=1 of page controlling registers 811, 821, 831, and 841 is selected. The CPU executes memory access to corresponding ones of memory chips 813, 823, 833, and 843.

Along with development of the semiconductor technique, highly integrated memory chips can be used, and four expanded memories 810, 820, 830, and 840 shown in FIG. 15 can be formed on one board.

In addition, four expanded memories 810, 820, 830 and 840, conventional memory 130, and extended memory 140 can be integrated on one system board. However, in such a system, the control circuit is complicated and cost is undesirably high.

As for the expanded memory, the PA bit length of the page controlling register may be increased from 7 bits to 9 bits, so that all the 512 logical pages are controlled by a single page controlling register. However, with this system, the page controlling register is different from that in the prior-art system, resulting in poor software compatibility.

SUMMARY OF THE INVENTION

It is an object of the present invention to provide a high-efficiency, large-capacity memory system that can maintain software compatibility with a prior-art expanded memory.

It is another object of the present invention to provide a memory system that can realize a high-efficiency, large-capacity expanded memory while maintaining software compatibility with a prior-art expanded memory, and that includes a conventional memory and an extended memory.

In order to achieve the above objects, the memory system of the present invention comprises:

a memory block consisting of a plurality of memory areas each having a page number indicating the corresponding memory area;

a memory section consisting of the memory blocks each having a set number indicating the corresponding memory block;

a page controlling register for storing mapping information as information indicating a page number of a memory area in which data supplied from a CPU through a window is stored;

a mapping register for storing mapping information including set information indicating a set number including a memory block in which data supplied from the CPU through the window is stored; and a memory controlling section for performing access of the memory section in accordance with the mapping information stored in the mapping register.

According to the present invention, a maximum of 8-MB expanded memory can be realized on one board if software compatibility with a prior-art expanded memory is to be maintained.

BRIEF DESCRIPTION OF THE DRAWINGS

Other objects and features of the present invention will be apparent from the following description taken in connection with the accompanying drawings, in which:

FIG. 3 is a view showing a data format of a mapping register shown in FIG. 2;

FIG. 4 is a table showing values of MA8 and MA7 shown in FIG. 3;

FIG. 7 is a view showing a data format of a mapping register shown in FIG. 6;

FIG. 8 is a table showing values of the mapping register when the amount of a conventional memory shown in FIG. 7 is 640 KB;

FIG. 9 is a table showing values of the mapping register shown in FIG. 7 when the amount of the conventional memory is 512 KB;

FIG. 16 is a view showing a data format of a page controlling register shown in FIG. 15.

DETAILED DESCRIPTION OF THE PREFERRED EMBODIMENTS

Figure 1:
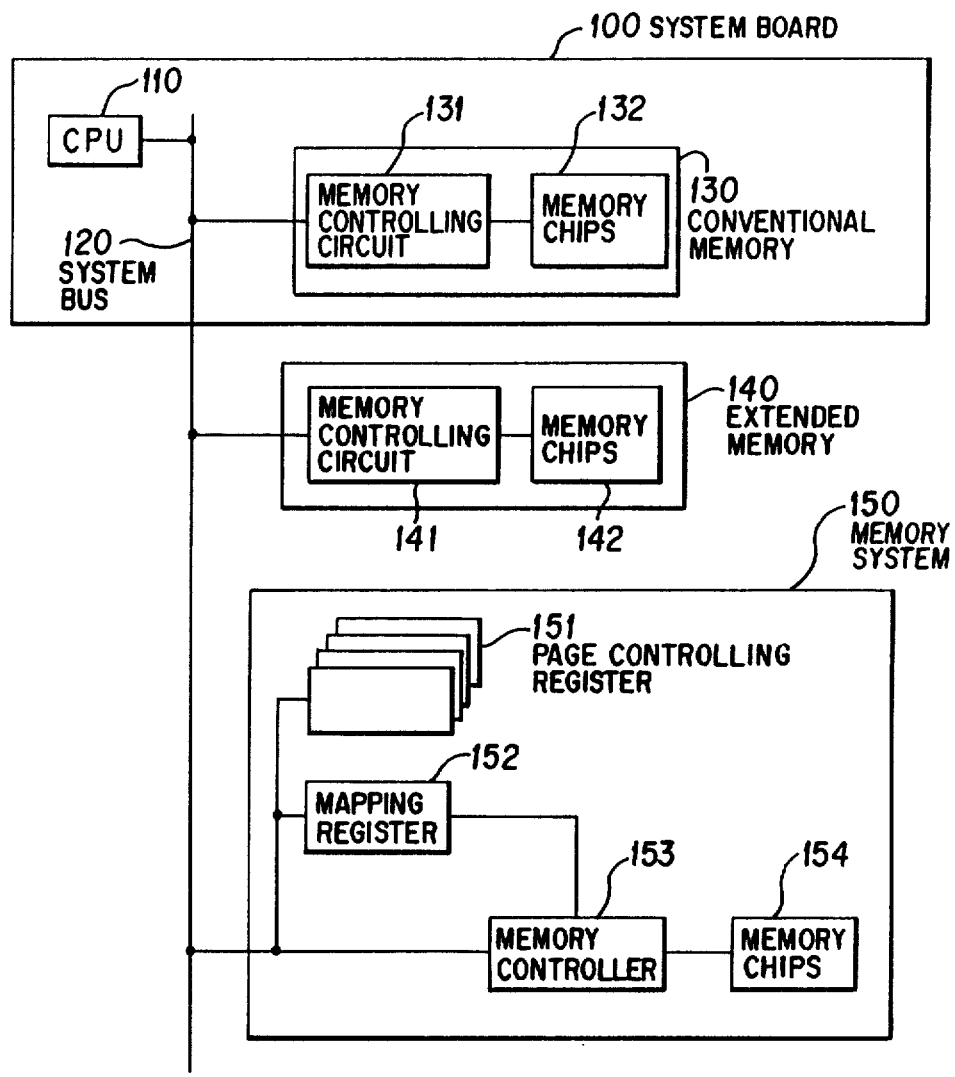
FIG. 1 is a block diagram showing an embodiment of the present invention.
Figure 15:
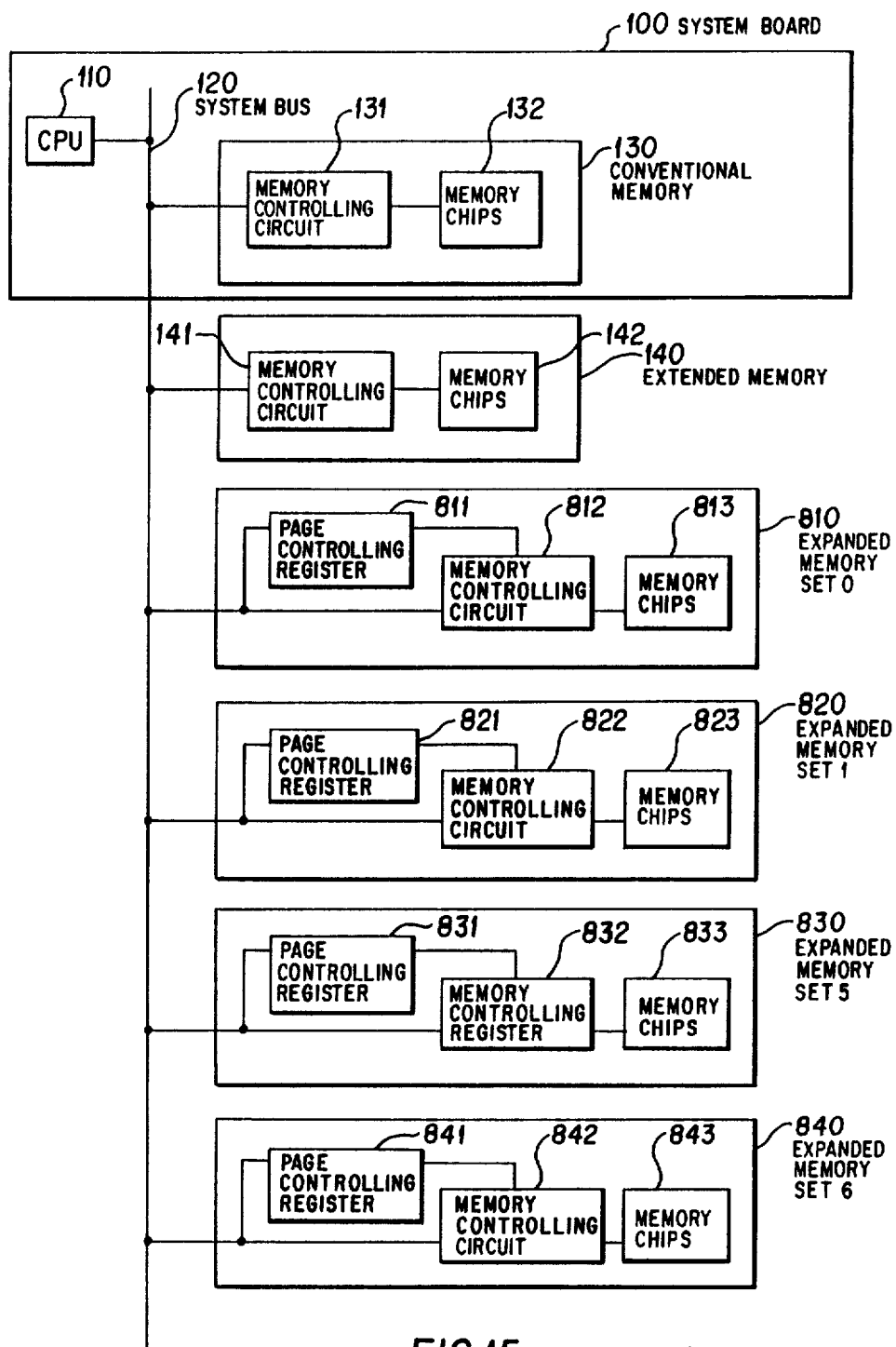
FIG. 15 is a block diagram showing a prior-art system.

FIG. 1 is a block diagram showing an embodiment of the present invention. Referring to FIG. 1, reference numeral 100 denotes a system board. System board 100 comprises CPU 110, system bus 120, and conventional memory 130. Conventional memory 130 comprises memory controlling circuit 131 and memory chips 132, and is connected to CPU 110 through system bus 120. Reference numeral 140 denotes an extended memory. Extended memory 140 comprises memory controlling circuit 141 and memory chips 142, and is connected to CPU 110 through system bus 120. Reference numeral 150 denotes a memory system. Memory system 150 comprises page controlling registers 151, mapping registers 152, memory controller 153, and memory chips 154, and is connected to CPU 110 through system bus 120. Page controlling registers 151 have the same format as that of page controlling registers 811, 821, 831, and 841 shown in FIGS. 15, and 16. Registers are arranged as in the system shown in FIG. 15. Four mapping registers 152 are arranged in correspondence with four physical pages, and each mapping register has a 10-bit length. A mapping register of page Y (Y=0, 1, 2, 3) has a format shown in FIG. 3. In FIG. 3, the bits of the mapping register have the following meanings:

ME: map enable bit

0: disable

Mapping from physical page Y to a logical page is not performed in the memory system shown in FIG. 1.

1: enable

Mapping from physical page Y to a logical page is performed in the memory system shown in FIG. 1;

MAi: map address bit (i=0 to 8)

A logical page to which the physical page is mapped is designated. If ME=0, this bit is invalid.

When ME=0, the MA bit is used when an expanded memory of this system is not used or when both a prior-art expanded memory and the expanded memory of this system are used. Mapping registers 152 are not transparent for CPU 110, while a total of 16 page controlling registers as in the prior-art system are transparent for CPU 110. Write access to each mapping register 152 is performed simultaneously with write access (I/O write) to page controlling register 151 by CPU 110.

Data having a format shown in FIG. 16 is I/O written by CPU 110 in page controlling register 151 of page Y and set X, and thereafter, the data is read out by I/O read of CPU 110. Data shown in FIG. 4 is written in a corresponding one of mapping registers 152 by I/O write. More specifically, the contents as in a PE bit is written into an ME bit, and MA bits (9 bits) represent a set number and a logical page number.

Figure 2:
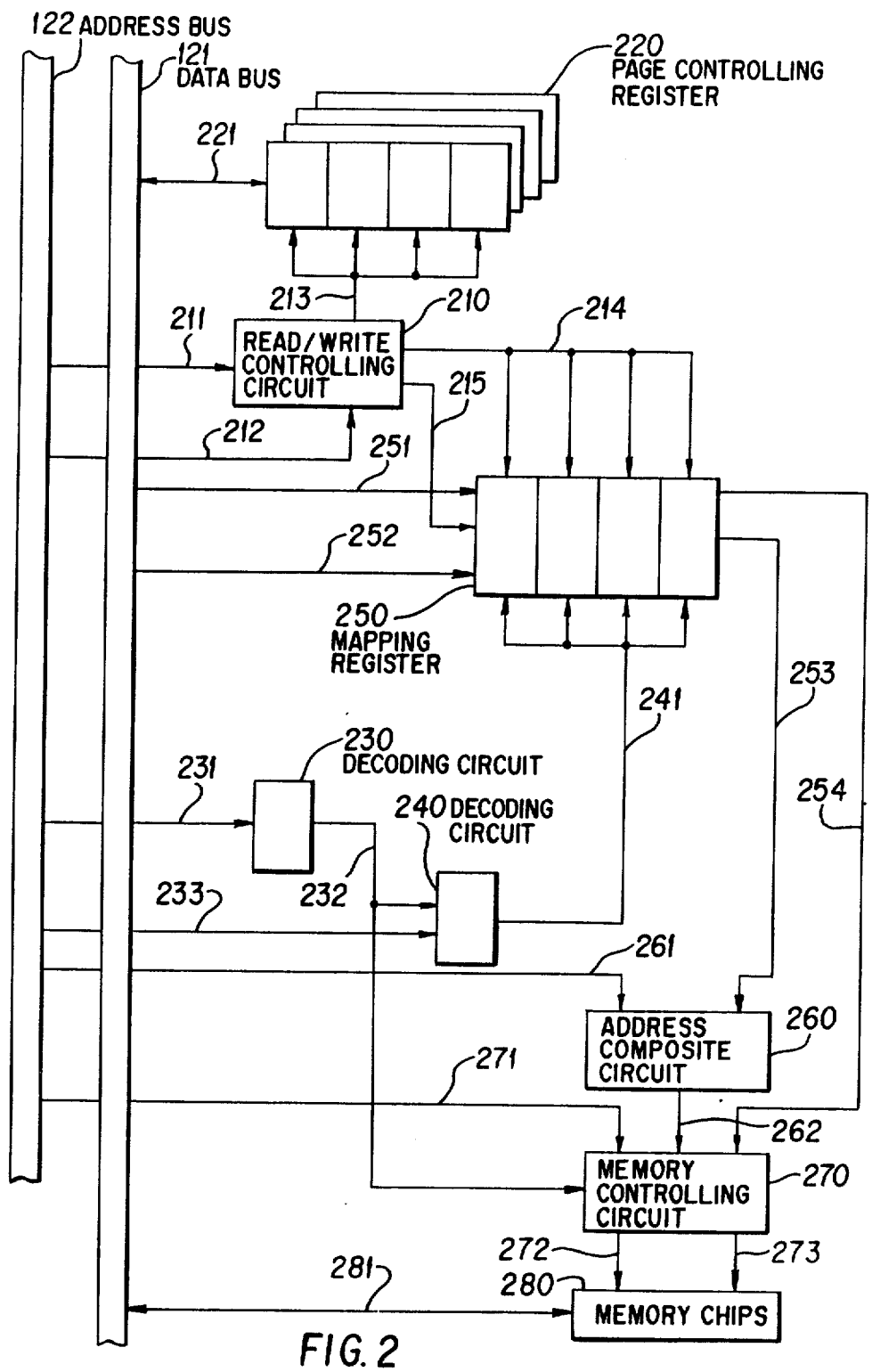
FIG. 2 is a detailed block diagram of a memory system shown in the FIG. 1.

FIG. 2 is a block diagram of memory system 150 shown in FIG. 1. Reference numeral 121 denotes a data bus; and reference numeral 122 denotes an address bus. Both buses 121 and 122 connect CPU 110 and memory system 150. Reference numeral 210 denotes a read/write controlling circuit, which is connected to address bus 122 through signal lines 211 and 212. Reference numeral 220 denotes page controlling registers, which are connected to data bus 121 through signal lines 221 and to read/write controlling circuit, 210 through signal line 213. Reference numeral 230 denotes a decoding circuit, which is connected to address bus 122 through signal line 231. Reference numeral 240 denotes a decoding circuit which is connected to decoding circuit 230 through signal line 232 and to address bus 122 through signal line 233. Reference numeral 250 denotes mapping registers, which are connected to read/write controlling circuit 210 through signal lines 214 and 215, to data bus 121 through signal lines 251 and 252, and to decoding circuit 240 through signal line 241. Reference numeral 260 denotes an address composite circuit, which is connected to address bus 122 through signal line 261 and to mapping registers 250 through signal line 253. Reference numeral 270 denotes a memory controlling circuit, which is connected to mapping registers 250 through signal line 254, to address bus 122 through signal line 271, to decoding circuit 230 through signal line 232, and to address composite circuit 260 through signal line 262. Reference numeral 280 denotes memory chips, which are connected to memory controlling circuit 270 through signal lines 272 and 273, and to data bus 121 through signal line 281.

CPU 110 writes arbitrary data (D0 to D7) in page controlling register 220 through signal line 221 by I/O write. At the same time, read/write controlling circuit 210 generates a page selecting signal and a set selecting signal based on addresses (A0 to A15) supplied through signal line 211 in accordance with a control signal supplied from CPU 110 through signal line 211. Then, data (D7) supplied from CPU 110 through signal line 251, data (D6 to D0), and the set selecting signal (BA8 and BA7) supplied from read/write controlling circuit 210 through signal line 215 are written in one of the mapping registers 250 selected by the page selecting signal supplied from read/write controlling circuit 210 through signal line 214. When CPU 110 performs memory access to a page frame, the mapping register corresponding to the designated physical page is selected by the above-mentioned signals. Address composite circuit 260 generates a memory access address as a combination of a signal (MA) supplied from mapping register 250 through signal line 253 and lower address bits (A0 to A13) supplied from CPU 110 through signal line 261. Memory controlling circuit 270 supplies a memory chip address through signal line 272 and a memory chip controlling signal through signal line 273 to memory chips 280 in accordance with the memory access address supplied from address composite circuit 260 to perform memory read/write access. Since the memory access address has a 23-bit length, 8-MB memory chips can be supported. This 8-MB size corresponds to 512 logical pages. CPU 110 changes data to be. written in page controlling register 220, thereby simultaneously changing data in the mapping register 250. More specifically, permission/inhibition of access to memory chips 280, and updating of memory addresses can be performed. In this embodiment, permanent page frame addresses are used. However, the present invention can be applied to a system that converts page frame addresses, such as the "ABOVE BOARD" of Intel Corp. In this embodiment, an expanded memory for combining four prior-art expanded memories has been exemplified. However, the present invention can be applied to an expanded memory for combining two or three prior-art expanded memories. In this case, two or three sets of page controlling registers are prepared accordingly.

Figure 5:
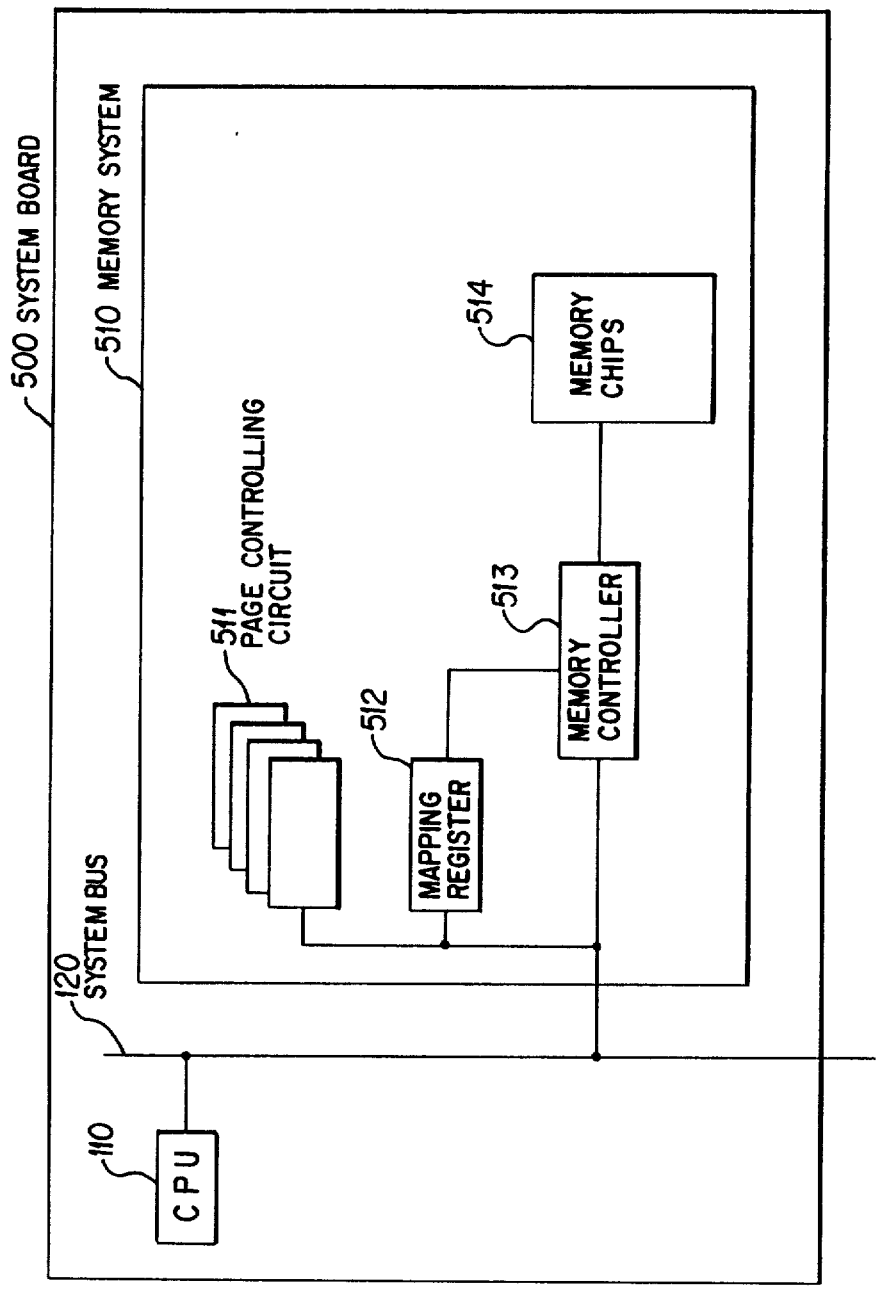
FIG. 5 is a block diagram showing another embodiment of the present invention.

FIG. 5 is a block diagram of a system according to another embodiment of the present invention. In FIG. 5, reference numeral 110 denotes a CPU, reference numeral 120 denotes, a system bus, and reference numeral 510 denotes a memory system. Memory system 510 comprises page controlling registers 511, mapping registers 512, memory controller 513, and memory chips 514, and is connected to CPU 110 through system bus 120. Page controlling registers 511 have the same format as that of page controlling registers 811, 821, 831, and 841 shown in FIGS. 15, and 16. Registers are provided as in the system shown in FIG. 15. Each mapping register has a 11-bit length. A mapping register of page Y (Y=0, 1, 2, 3) has a format shown in FIG. 7. In FIG. 7, the bits of the mapping register have the following meanings:

ME: map enable bit

0: disable

Mapping from physical page Y to a logical page is not performed in the memory system shown in FIG. 5.

1: enable

Mapping from physical page Y to a logical page is performed in the memory system shown in FIG. 5.

MAi: map address bit (i=14 to 23)

A logical page to which a physical page is mapped is designated.

When ME=0, the MA bit is invalid. When ME=0, the MA bit is used when an expanded memory of this system is not used or when both a prior-art expanded memory and the expanded memory of this system are used. Since 512 logical pages (0 to 511) are provided, an arbitrary logical page can be designated from 512 logical pages by 9 bits. Memory access addresses assigned to the expanded memory do not start from "0", but MAi requires 10 bits. Mapping registers 512 are not transparent for CPU 110, while a total of 16 page controlling registers as in the prior-art system are transparent for CPU 110. Write access to mapping registers 512 is performed simultaneously with write access (I/O write) to page controlling registers 511.

The following discussion assumes that data having the format shown in FIG. 16 is I/O written in a page controlling register of page Y and set X by CPU 110.

(1) The data is written in a corresponding one of page controlling registers 511 and, thereafter, is read out by I/O read of CPU 110.

(2) At the same time, ME=PE and MAi=PA (i−14)+BAi (i=14 to 23) are written in a corresponding one of mapping registers 512. Note that PA9=-PA8=PA7=0, and BAi (i=14 to 23) is permanent data shown in FIG. 8 when the amount of a conventional memory is 640 KB, and is permanent data shown in FIG. 9 when the amount of the conventional memory is 512 KB. MAi includes information of set X. However, the PA bit of each page controlling register indicates only an offset value of a logical page number of each set X.

BAi are values for logical pages having an offset value "0" of a logical page number, i.e., logical pages "0", "128", "256", and "384". BAi can also be regarded as upper 10 bits of a starting address of each set in an expanded memory area in the memory access address space. It is important to note that addition is performed in each mapping register 512. Normally, data in each mapping register 512 is read out when the CPU performs memory read/write access through the page frame. Upon read access, addition may be performed. In this case, the time required to perform addition prolongs the memory access time. In this embodiment, however, since addition is performed upon write access to each mapping register 512, the memory access time is not prolonged.

Figure 6:
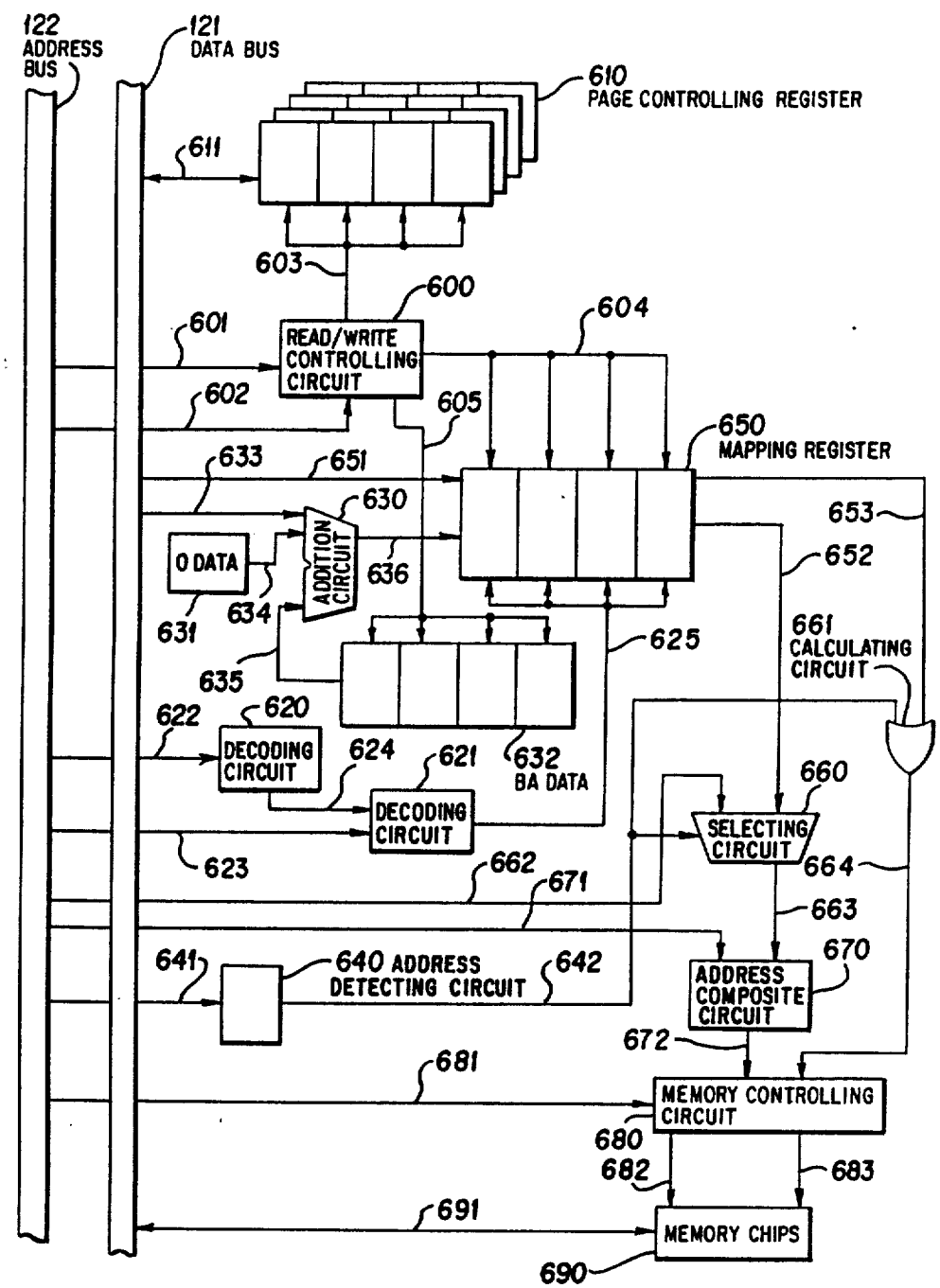
FIG. 6 is a detailed block diagram of a memory system shown FIG. 5.

FIG. 6 is a block diagram of memory system 510 shown in FIG. 5. Reference numeral 121 denotes a data bus and reference numeral 122 denotes an address bus. Both buses 121 and 122 connect CPU 110 and memory system 510. Reference numeral 600 denotes a read/-write controlling circuit, which is connected to address bus 122 through signal lines 601 and 602. Reference numeral 610 denotes page controlling registers, which are connected to read/write controlling circuit 600 through signal line 603 and to data bus 121 through signal line 611. Reference numerals 620 and 621 denote decoding circuits. Decoding circuit 620 is connected to address bus 122 through signal line 622. Decoding circuit 621 is connected to decoding circuit 620 through signal line 624 and to address bus 122 through signal line 623. Reference numerals 630, 631, and 632 denote covering circuits. Specifically, reference numeral 630 denotes an addition circuit, reference numeral 631 denotes a 0 data circuit, reference numeral 632 denotes a BA data circuit. Addition circuit 630 is connected to data bus 122 through signal line 633, to 0 data circuit 631 through signal line 634, and to BA data circuit 632 through signal line 635. BA data circuit 632 is connected to read/write controlling circuit 600 through signal line 605. Reference numeral 640 denotes an address detecting circuit, which is connected to address bus 122 through signal line 641. Reference numeral 650 denotes mapping registers, which are connected to read/write controlling circuit 600 through signal line 604, to data bus 121 through signal line 651, to addition circuit 630 through signal line 636, and to decoding circuit 621 through signal line 625. Reference numeral 660 denotes a selecting circuit, which is connected to mapping registers, 650 through signal line 652, to address bus 122 through signal line 662, and to address detecting circuit 640 through signal line 642. Reference numeral 661 denotes a calculating circuit, which is connected to mapping registers 650 through signal line 653 and to address detecting circuit 640 through signal line 642. Reference numeral 670 denotes an address composite circuit, which is connected to address bus 122 through signal line 671, and to selecting circuit 660 through signal line 663. Reference numeral 680 denotes a memory controlling circuit, which is connected to calculating circuit 661 through signal line 664, to address bus 122 through signal line 681, and to address composite circuit 670 through signal line 672. Reference numeral 690 denotes memory chips, which are connected to memory controlling circuit 680 through signal lines 682 and 683, and to data bus 121 through signal line 691.

Figure 10:
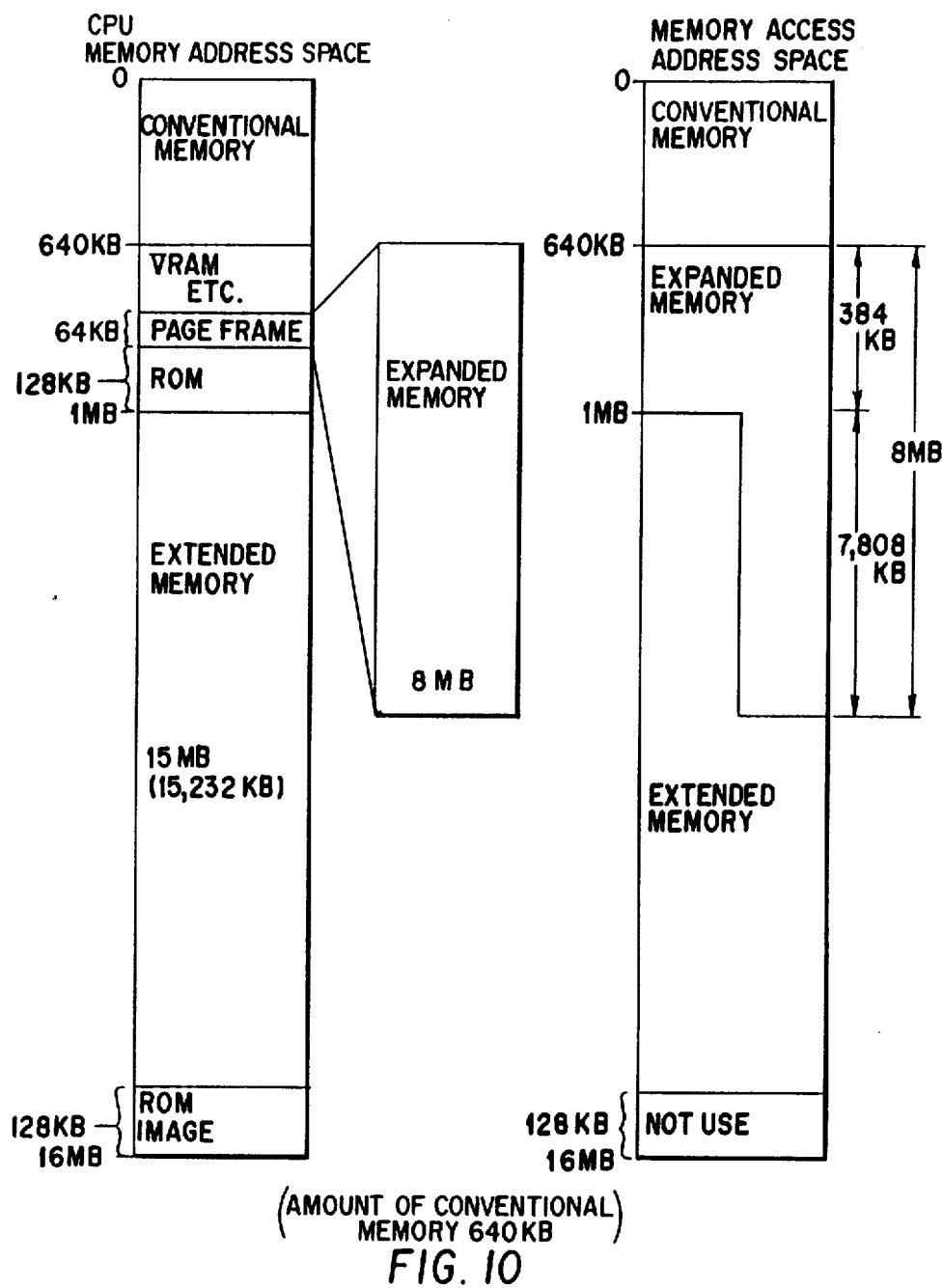
FIG. 10 is a view showing the relationship between a memory address space of a CPU and a memory chip address space in a system in which portions serving as extended and expanded memory areas are present in memory chips and the amount of the conventional memory is 640 KB.
Figure 11:
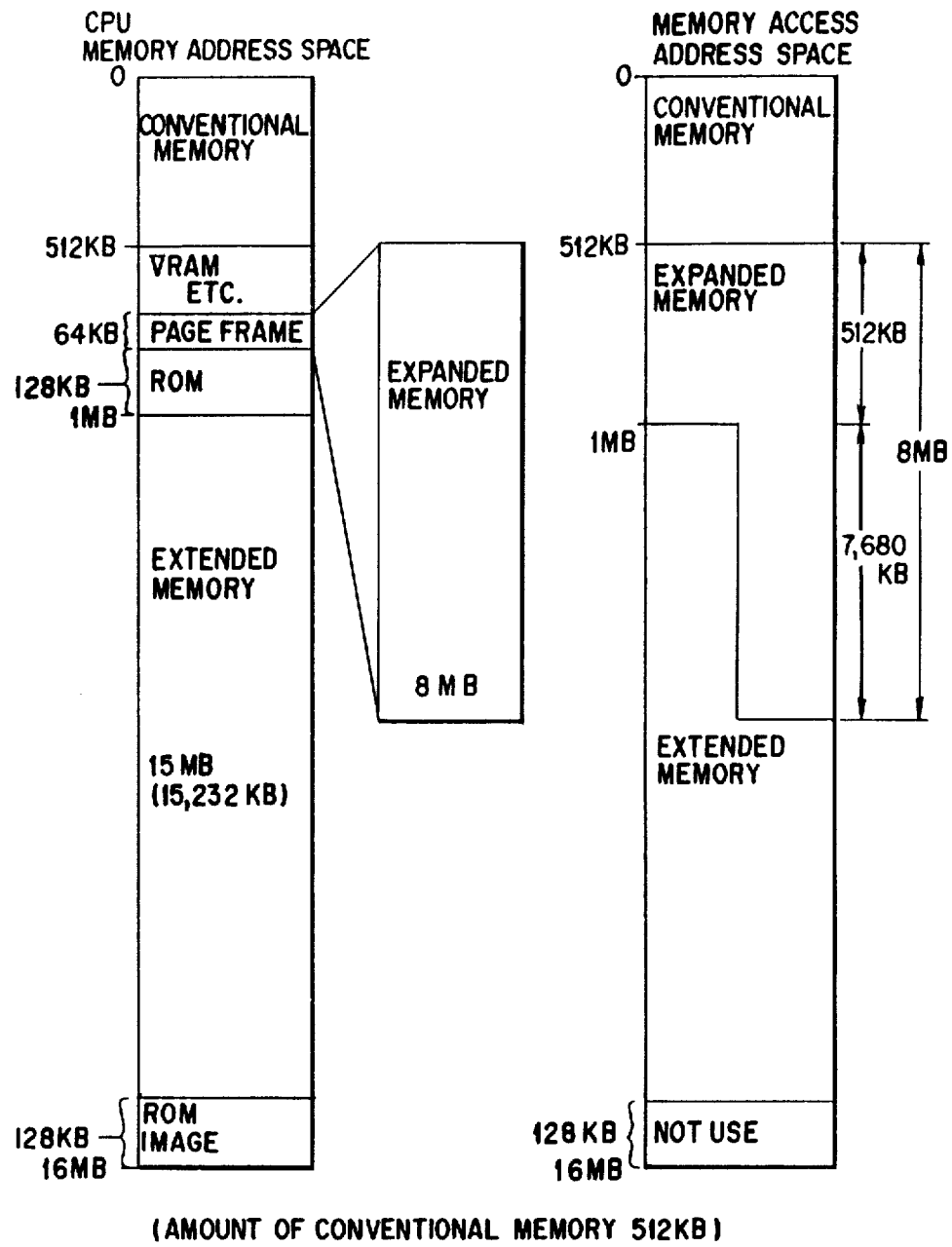
FIG. 11 is a view showing the relationship between the memory address space of the CPU and the memory chip address space in a system in which portions serving as extended and expanded memory areas are present in memory chips and the amount of the conventional memory is 512 KB.
Figure 12:
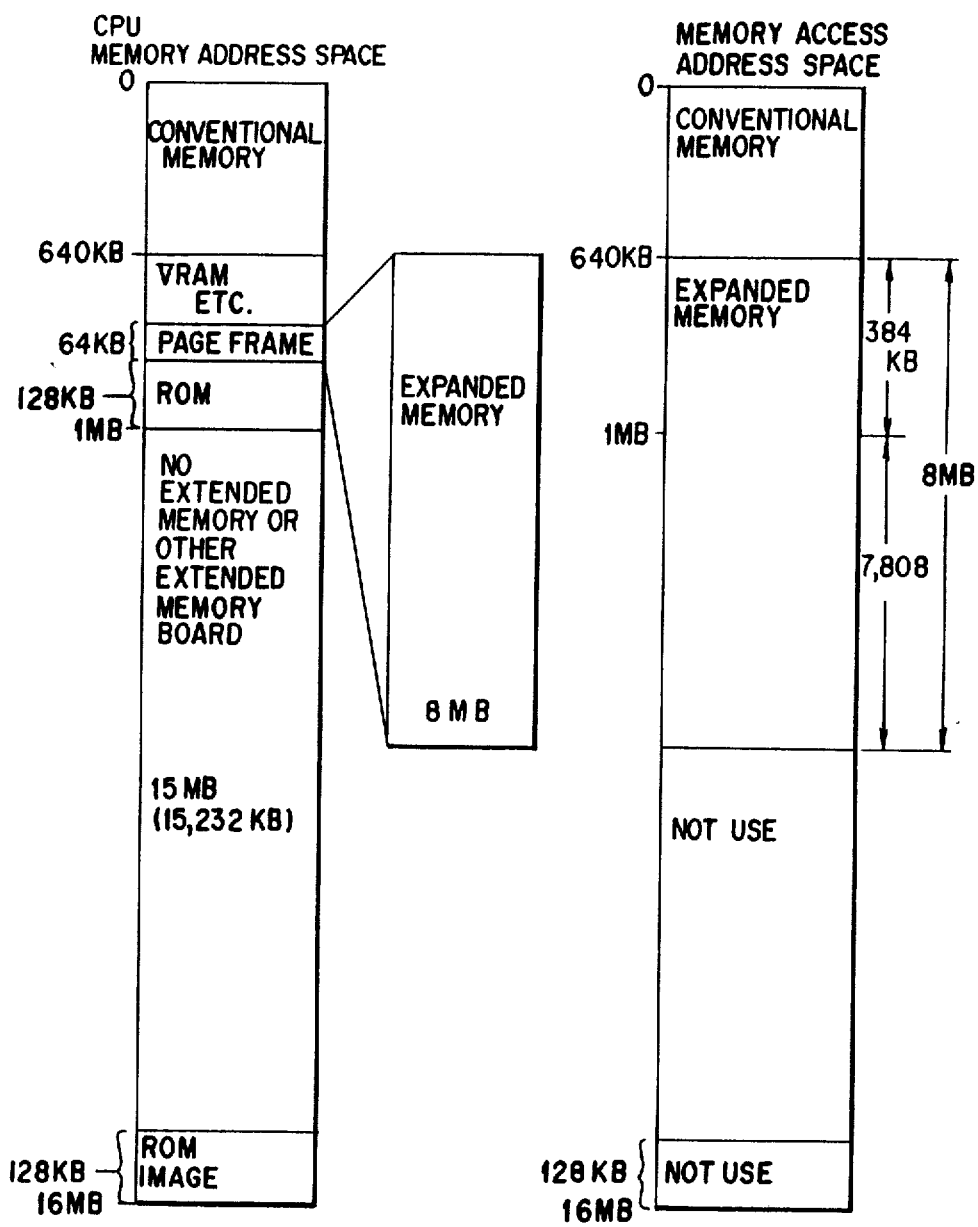
FIG. 12 is a view showing the relationship between the memory address space of the CPU and the memory chip address space in a system in which no extended memory area is present in memory chips and the amount of the conventional memory is 640 KB.
Figure 13:
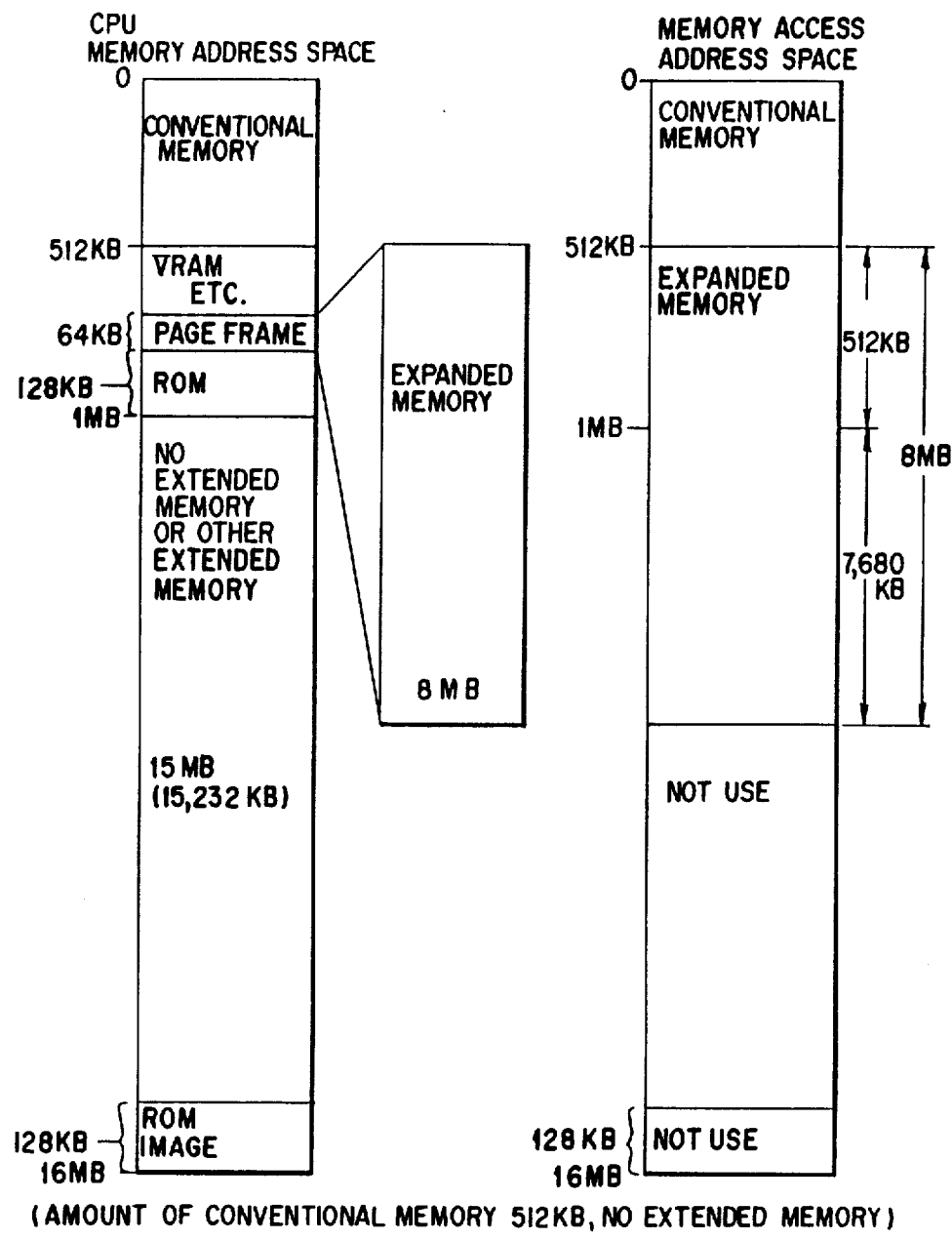
FIG. 13 is a view showing the relationship between the memory aaddress space of the CPU and the memory chip address space in a system in which no extended memory area is present in memory chips and the amount of the conventional memory is 512 KB.
Figure 14:
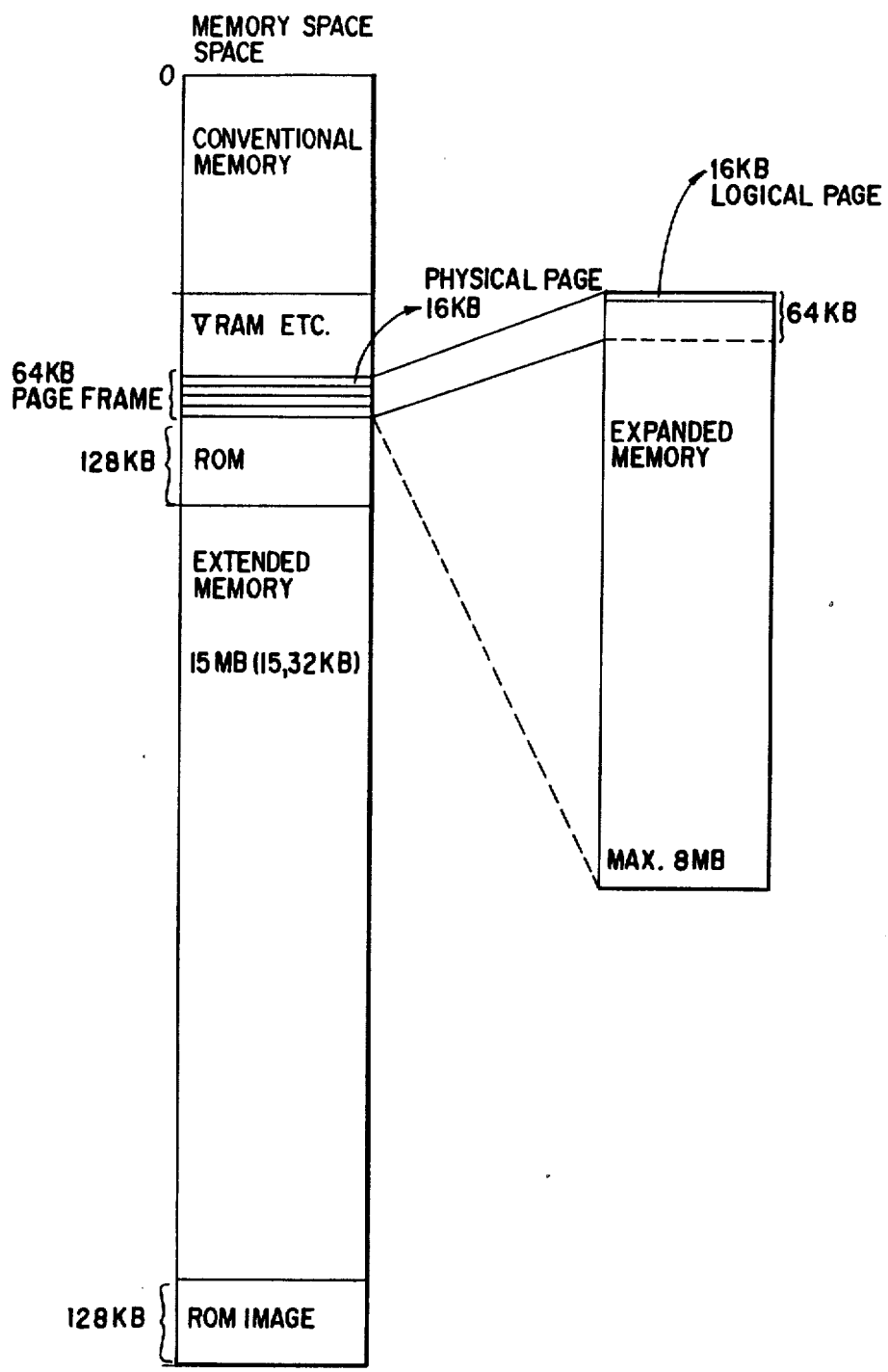
FIG. 14 is a view showing an address space of an expanded memory of an LIM system.

FIG. 10 is a view showing the relationship between a memory address and a memory access address space of a CPU in a system in which portions serving as extended and expanded memory areas are present in memory chips 690, and in which the amount of conventional memory is 640 KB. FIG. 11 is a view showing the relationship between a memory address space and a memory access space of a CPU in a system in which portions serving as extended and expanded memory areas are present in memory chips 690, and in which the amount of conventional memory is 512 KB. FIG. 12 is a view showing the relationship between a memory address space and a memory access address space of a CPU in a system in which no extended memory area is present in memory chips 690, and in which the amount of a conventional memory is 640 KB. FIG. 13 is a view showing the relationship between a memory address space and a memory access address space of a CPU in a system in which no extended memory area is present in memory chips 690, and in which the amount of conventional memory is 512 KB. In either case, MAi of each mapping register 650 retains 10 upper bits of a 24-bit address in the rightmost address space of the Figure, i.e., the memory access address space. In FIGS. 10 and 11, the portions serving as extended and expanded memory areas are managed under software control.

CPU 110 I/O writes arbitrary data (D0 to D7) in corresponding page controlling register 610 through signal line 611. At the same time, read/write controlling circuit 600 generates a page selecting signal and a set selecting signal from addresses (A0 to A15) supplied from CPU 110 through signal lines 601. Data (D7) supplied from CPU 110 through signal line 651 and data (MAi) supplied from addition circuit 630 through signal line 636 are written in one of mapping registers 650 selected by the page selecting signal supplied from read/write controlling circuit 600 through signal line 604. The data (MAi) is obtained by adding data "0" corresponding to PA9, PA8, and PA7 supplied from 0 data circuit 631, BAi supplied from BA data circuit 632, and data (D0 to D6) supplied from CPU 110 through signal line 633 by addition circuit 630. When CPU 110 performs memory access to the page frame, mapping register 650, corresponding to the designated physical page, is selected by the respective signals. At the same time, since address detecting circuit 640 detects that the page frame address is not a conventional memory address or an extended memory address, it sets a detecting signal to be "0". Signal ME supplied from mapping register 650 through signal line 653 is supplied to memory controlling circuit 680 through calculating circuit 661, thereby permitting or inhibiting memory access. Address composite circuit 670 synthesizes a memory access address using data (MAi) supplied from mapping register 650 through signal line 652 as upper address bits and data (A0 to A13) supplied from CPU 110 through signal line 671 as lower address bits, and supplies the generated address to memory controlling circuit 680 through signal line 672. The 24-bit memory access address consists of bits A0 to A13 and MA14 through MA23. CPU 110 changes data to be written in page controlling register 610, thereby simultaneously updating data in mapping register 650. That is, permission/inhibition of access to memory chips 690 and updating of memory addresses can be performed. However, updating of memory addresses can be performed in only a predetermined expanded memory area. From the viewpoint of CPU 110, the same image as in the case wherein four prior-art expanded memories are mounted is presented.

A case will be described wherein CPU 110 accesses the conventional memory and the extended memory. Address detecting circuit 640 outputs detecting signal "1", and signal "1" is supplied from calculating circuit 661 to memory controlling circuit 680 through signal line 664, thereby permitting memory access. Selecting circuit 660 selects data (A14 to A23) supplied from CPU 110 through signal line 662, and supplies the selected data to address composite circuit 670 through signal line 663. Address composite circuit 670 synthesizes a memory access address using the data (A14 to A23) as upper address bits and data (A0 to A13) supplied from CPU 110 through signal line 671 as lower address bits. The 24-bit memory access address consists of bits A0 to A23. This address is equal to the memory access address of CPU 110, and the same image as in the case wherein the prior-art conventional and extended memories are accessed is presented. Memory controlling circuit 680 generates, to memory chips 690, a memory chip address and a memory controlling signal in accordance with the memory access address supplied from address composite circuit 670 through signal line 672, a memory access enable signal supplied from calculating circuit 661 through signal line 664, and a memory read/write signal supplied from CPU 110 through signal line 681, reardless of the conventional memory, the extended memory, and the expanded memory, thereby accessing memory chips 690.

In this embodiment, permanent page frame addresses are employed. However, the present invention can be applied to a system that can vary page frame addresses, such as the "ABOVE BOARD" of Intel Corp. In the above embodiment, four prior-art expanded memories are combined together. However, one, two, or three prior-art expanded memories may be combined. In this case, one, two, or three sets of page controlling registers are prepared. In this embodiment, the memory formats shown in FIGS. 10, 11, 12, and 13 have been exemplified. However, the present invention may be applied to other memory formats by changing the decoding circuit and BA data.

In this manner, a conventional memory, an extended memory, and a plurality of expanded memories which individually have control circuits and memory chips can be realized as a memory system having a common memory control circuit and common memory chips. Since data in page controlling registers need not be read out upon memory access by the CPU, a access speed requirement for the memory controlling circuit can be moderated as compared to a memory which determines a memory access address and permission of memory access after PE and PA are read out. Since addition for determining the memory access address upon access of the expanded memory is performed when data is written in the mapping register, the memory access time can be shortened as compared to a memory which performs addition upon data read access from the mapping register. The system of the present invention can have software compatibility with the prior-art memory system. When a 1-MB conventional memory is mounted in a prior-art system, 348 KB are wasted in the 640-KB format, and 512-KB are wasted in the 512 KB format. However, in this invention, these wasted memory areas can be used as an expanded memory. Both prior-art expanded and extended memory boards can be used. If a small number of memory chips are mounted on a board, and hence, the memory capacity is small, expansion can be easily performed by only adding memory chips. Thus, an expanded memory of an 8-MB board can be easily realized.

What is claimed is:

1. An information processing apparatus defining a window in a portion of an address space of a CPU and accessing a memory area, comprising:
   a memory section including a plurality of memory blocks, each of the plurality of memory blocks having a set number, each of the memory blocks including a plurality of memory areas, each of the plurality of memory areas having a page number;
   a page control means, connected to the CPU, for storing mapping information which is supplied from the CPU and which represents a page number of a memory area in which data is stored;
   a mapping register, connected to the CPU and the page control means, for storing mapping information including set information indicating a set number of a memory block in which the data supplied from the CPU is stored; and
   a memory control means, connected to the CPU, the page control means, the mapping register and the memory section, for accessing the memory section in accordance with the mapping information stored in the mapping register and the page control means.

2. An information processing apparatus according to claim 1, wherein the memory control means includes:
   a read/write controlling circuit, connected to the CPU, the page control means, and the mapping register, for controlling read/write access to the page control means and write access to the mapping register in accordance with a control signal supplied from the CPU;
   a decoding circuit, connected to the CPU, for detecting a page frame address indicating an address of the window from a memory address supplied from the CPU, and for calculating a position of the window in the address space;
   an address composite circuit, connected to the CPU and the mapping register, for synthesizing a memory access address from the mapping register using the mapping information supplied through the mapping register, and a system address supplied from the CPU; and
   a memory controlling circuit, connected to the CPU, the address composite circuit, the mapping register, the decoding circuit and the memory section, for accessing the memory section in accordance with a memory access enable signal generated by and supplied from the mapping register, a page frame decode signal generated by and supplied from the decoding circuit, the memory access address supplied from the address composite circuit, and a memory read/write signal supplied from the CPU.

3. An information processing apparatus according to claim 1, wherein the memory control means includes:
   a read/write controlling circuit, connected to the CPU, the page control means, and the mapping register, for controlling read/write access to the page control means and write access to the mapping register in accordance with a control signal supplied from the CPU;
   a decoding circuit, connected to the CPU, for detecting a page frame address indicating an address of the window from a memory address supplied from the CPU, and for calculating a position of the window in the address space;
   an address detecting circuit, connected to the CPU, for detecting addresses of a conventional memory which can be directly recognized and accessed by the CPU and an extended memory which can be directly recognized and accessed by the CPU from an address supplied from the CPU;
   a selected circuit, connected to the CPU and the address detecting circuit, for selecting one of the mapping information supplied through the mapping register and the address supplied from the CPU in accordance with a detecting signal generated by and supplied from the address detecting circuit;
   an address composite circuit, connected to the CPU and the mapping register, for synthesizing a memory access address from the mapping register using the mapping information supplied through the mapping register, and a system address supplied from the CPU;
   a calculating circuit, connected to the address detecting circuit and the mapping register, for generating a memory access enable signal in accordance with the detecting signal supplied from the address detecting circuit and the mapping information supplied from the mapping register; and
   a memory controlling circuit, connected to the CPU, the address composite circuit, the calculating circuit and the memory section, for accessing the memory section in accordance with a memory access enable signal supplied from the calculating circuit, the memory access address supplied from the address composite circuit, and a memory read/write signal supplied from the CPU.

* * * * *